United States Patent [19]
Nakamura et al.

[11] Patent Number: 6,053,619
[45] Date of Patent: Apr. 25, 2000

[54] BACKLIGHT DEVICE

[75] Inventors: Kyotaro Nakamura, Nara; Yutaka Fujiyama, Nigata, both of Japan

[73] Assignees: Sharp Kabushiki Kaisha, Osaka; Sharp Niigata Electronics Corporation, Nigata-ken, both of Japan

[21] Appl. No.: 09/110,858

[22] Filed: Jul. 7, 1998

[30] Foreign Application Priority Data

Jul. 8, 1997 [JP] Japan .................................. 9-182253

[51] Int. Cl.[7] ...................................................... F21V 8/00
[52] U.S. Cl. ............................................. 362/31; 362/561
[58] Field of Search .................................. 362/26, 31, 29, 362/298, 299, 301, 303, 346, 349, 561

[56] References Cited

U.S. PATENT DOCUMENTS

| | | | |
|---|---|---|---|
| 4,648,690 | 3/1987 | Ohe | 362/31 X |
| 5,207,493 | 5/1993 | Murase et al. | 362/31 |
| 5,392,199 | 2/1995 | Kashima et al. | 362/31 |
| 5,688,035 | 11/1997 | Kashima et al. | 362/31 |
| 5,851,062 | 12/1998 | Shinohara et al. | 362/26 X |

FOREIGN PATENT DOCUMENTS

5-249461  9/1993  Japan .

*Primary Examiner*—Laura K. Tso
*Attorney, Agent, or Firm*—Nixon & Vanderhye P.C.

[57] ABSTRACT

A backlight device includes: a light source; a light-guiding plate; and a reflector. The light-guiding plate has a first principal surface and a second principal surface provided so as to face each other, and an end surface. The reflector is disposed so as to illuminate the end surface with light from the light source. The light-guiding plate has an output region on the first principal surface, for outputting light inputted from the end surface. An anti-reflection member is provided above the first principal surface in a region between the output region and the end surface.

8 Claims, 7 Drawing Sheets

BACKLIGHT DEVICE

BACKGROUND OF THE INVENTION

1. Field of the Invention

The present invention relates to a backlight device having a light source at the side of a side surface thereof, for illuminating a display unit which does not emit light by itself, such as a liquid crystal display.

2. Description of the Related Art

In recent years, along with the progress of hardware, the use of notebook type personal computers having the function of a desktop computer, a personal digital assistant (PDA), and the like has spread widely.

At present, a display unit of the aforementioned notebook type personal computer or the personal digital assistant generally employs a liquid crystal display panel.

However, the aforementioned liquid crystal display panel itself does not have a light-emitting function. Therefore, as a method for enabling the liquid crystal display panel to display information, such liquid crystal display panels employ either a backlight type method in which a light source is placed at the back side of a liquid crystal display panel or a reflection type method in which light from the front side of a liquid crystal display panel is reflected. Due to greater ability to see a display screen, the backlight type liquid crystal display panels are more widely used.

In Japanese Laid-open Publication No. 5-249461, for example, as a technique for the backlight structure, a reflection unit of the backlight is tapered so as to realize the miniaturization of the liquid crystal display panel.

Figure 8:
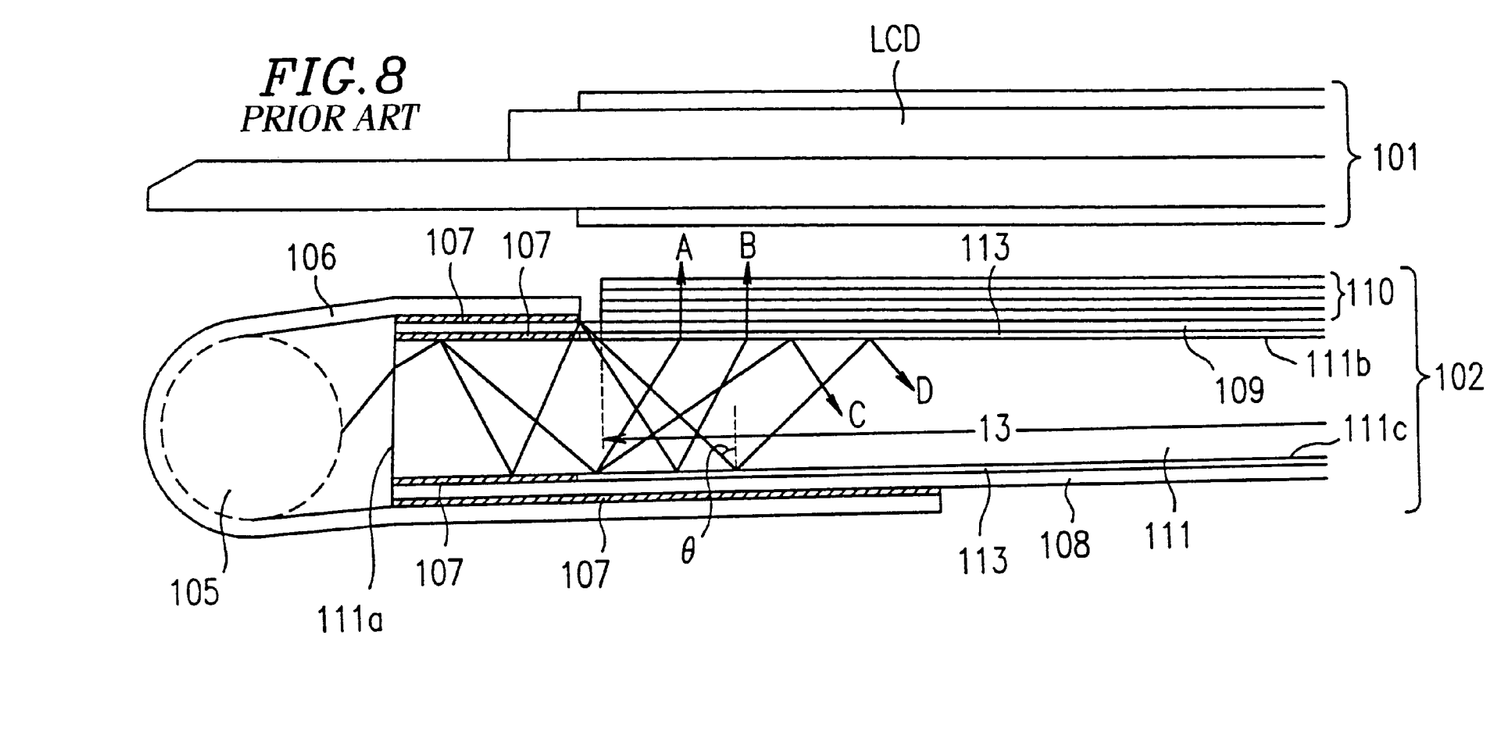
FIG. 8 is a cross-sectional view showing a part of a liquid crystal display device having a conventional backlight device and a liquid crystal display element.

FIG. 8 is a cross-sectional view showing a part of a liquid crystal display device having a conventional backlight device 102 and a liquid crystal display panel 101.

A diffusing sheet 109 is fixed on a surface f acing the liquid crystal display panel 101 of the light-guiding plate 111, and a white reflection sheet 108 is fixed on an opposite surface thereof. The diffusing sheet 109 and the white reflection sheet 108 are fixed at an edge of the light-guiding plate 111 with double-sided adhesive tapes 107. The light-guiding plate 111 has an output region 13 for outputting light incident from an end surface of the light-guiding plate 111 on the surface facing the liquid crystal display panel 101, and a plurality of prism sheets 110 are provided so as to include the output region 13 above the diffusing sheet 109.

In the case where the light-guiding plate 111 is made of an acrylic material, for example, essentially light rays each having a reflection angle of $\theta > 42°$ with respect to the reflection sheet 108, which are input from an end surface 111$a$ of the light-guiding plate 111, (e.g., light rays C and D in FIG. 8) are totally reflected at the interface between the light-guiding plate 111 and air layer 113. As a result, the light rays are not output outside through a surface 111$b$ of the light-guiding plate 111. However, by printing a reflection pattern (not shown) on a surface 111$c$ of the light-guiding plate 111 so as to change the reflective angle of such light rays to $\theta < 42°$, light rays (e.g., light rays A and B in FIG. 8) are output from the surface 111$b$ of the light-guiding plate 111.

According to the above-described conventional backlight device 102, however, in order to fix a reflector 106, the diffusing sheet 109, and the reflection sheet 108 to the light-guiding plate 111, it is necessary to fix edges thereof to the light-guiding plate 111 by the double-sided adhesive tapes 107. Due to the influence of the double-sided adhesive tapes 107, leakage of light in the vicinity of the lamp 105 which is a light source, or glare in a display image occurs.

Specifically, according to such a conventional structure, although light rays are reflected at an interface of the light-guiding plate 111 and the air layer 113, light rays are irregularly reflected at an interface of the light-guiding plate 111 and the double-sided adhesive tape 107. Therefore, as shown in FIG. 8, light rays C and D travel through the light-guiding plate 111 while being reflected. On the other hand, of the light rays reflected at the interface of the light-guiding plate 111 and the double-sided adhesive tape 107, light rays A and B are directly output outside from the light-guiding plate 111.

Due to the light which is irregularly reflected by the double-sided adhesive tape 107 and leaked directly outside from the light-guiding plate 111, light leakage at the surface facing the liquid crystal display panel 101 in the vicinity of the double-sided adhesive tape 107 or glare in a display image occurs.

In the vicinity of the double-sided adhesive tapes 107, the amount of light output from the surface 111$b$ of the light-guiding plate 111 is increased due to the irregular reflection caused by the pieces of double-sided tape 107, thereby increasing the amount of light input to the prism sheets 110. As a result, the amount of light refracted in the prism sheets 110 to be output towards the liquid crystal display panel 101 is increased especially in the vicinity of the pieces of double-sided adhesive tape 107. Consequently, glare in a display image occurs.

If the pieces of double-sided adhesive tape 107 which are the cause of the irregular reflection are eliminated, however, attachment of the reflection sheet 108 and the diffusing sheet 109 to the light-guiding plate 111 becomes loose.

SUMMARY OF THE INVENTION

According to one aspect of this invention, a backlight device includes: a light source; a light-guiding plate; and a reflector. The light-guiding plate has a first principal surface and a second principal surface provided so as to face each other, and an end surface. The reflector is disposed so as to illuminate the end surface with light from the light source. The light-guiding plate has an output region on the first principal surface, for outputting light inputted from the end surface. An anti-reflection member is provided above the first principal surface in a region between the output region and the end surface.

In one embodiment of the present invention, the reflector covers the light source and the anti-reflection member.

In another embodiment of the present invention, the anti-reflection member is made of black ink.

In still another embodiment of the present invention, the anti-reflection member is made of a black tape.

In still yet another embodiment of the present invention, the light-guiding plate has a diffusing sheet on the first principal surface; and the anti-reflection member is formed on the diffusing sheet.

According to another aspect of this invention, a backlight device further includes a prism sheet above the output region of the light-guiding plate.

According to the backlight device of the present invention, the anti-reflection member formed above the first principal surface of the light-guiding plate positioned between the output region of the light-guiding plate and the end surface of the light-guiding plate absorbs unnecessary light irregularly reflected by the double-sided adhesive tapes provided in the vicinity of the lamp. As a result, light is not directly output outside from the light-guiding plate.

Therefore, glare in a display image can be prevented, thereby obtaining a high-quality display screen.

Moreover, according to the present invention, by previously attaching the anti-reflection member to the back surface of the reflector, it is possible to provide the anti-reflection member with a small width by aligning the anti-reflection member with the first principal surface of the light-guiding plate.

Thus, the invention described herein makes possible the advantage of providing a backlight device having a function of preventing light leakage in the vicinity of a light source or glare in a display image.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but non-limiting examples with reference to the accompanying drawings.

Figure 1:
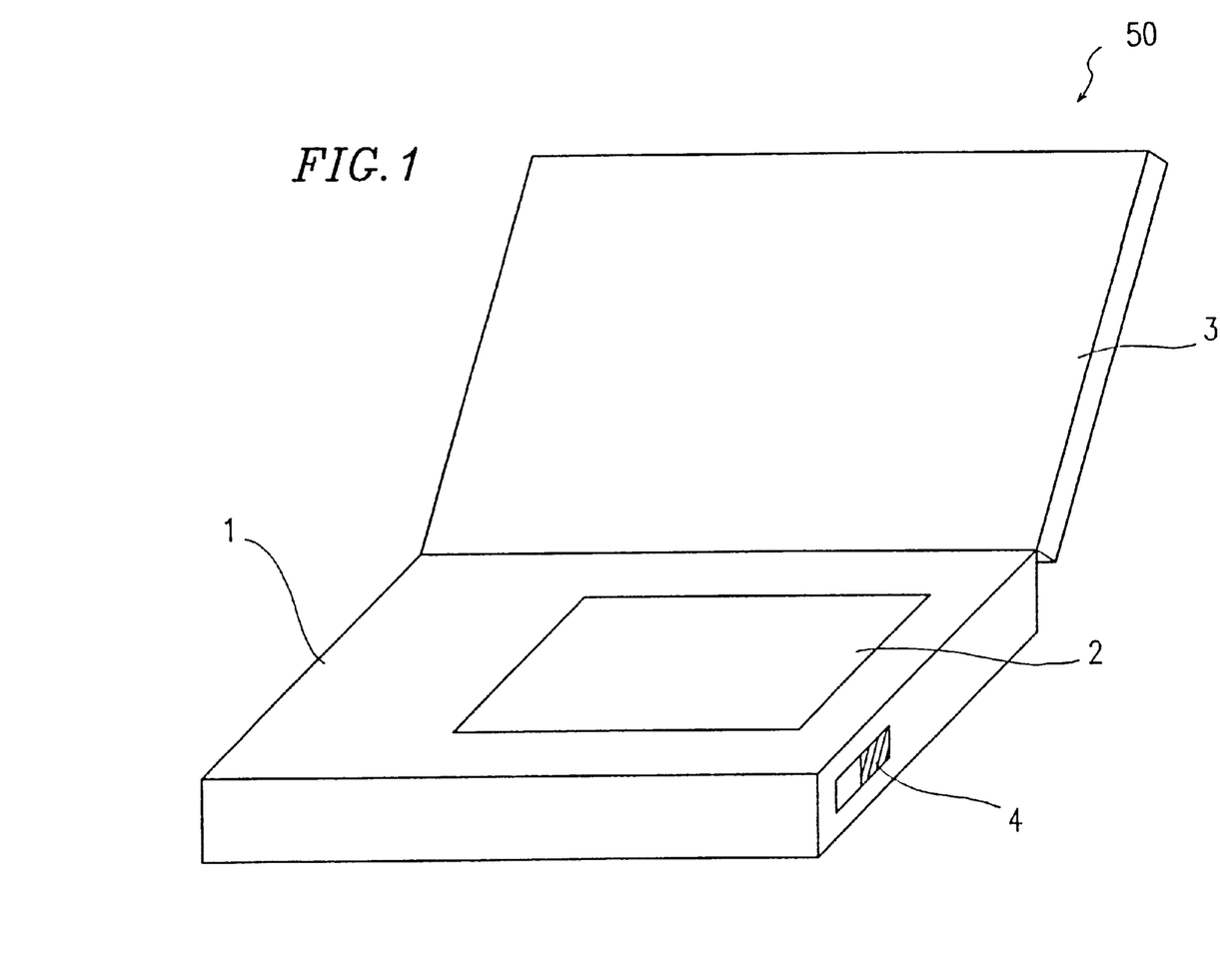
FIG. 1 is a perspective view showing an appearance of an electronic device having a backlight device according to the present invention.

FIG. 1 is a perspective view showing an appearance of an electronic device 50 including a liquid crystal display device which contains a backlight device according to the present invention.

In FIG. 1, the electronic device 50 has a main body cabinet unit 1 and a cover unit 3. The main body cabinet unit 1 has an input/output unit 2 (see FIG. 2) in which a display unit and a transparent tablet are integrated, an infrared communication unit (not shown), a pen holder (not shown), and the like. The main body cabinet unit 1 includes therein a power supply unit for supplying power to a place where a power supply is needed, for example, to a controlling circuit for controlling the input/output unit 2, the infrared communication unit, an interface, and the like.

In particular, the input/output unit 2 will be described in detail later with reference to FIG. 2.

The cover unit 3 is connected to the back surface of the main body cabinet unit 1 by a hinge. The cover unit 3 pivots so as to cover the input/output unit 2, thereby serving to protect the input/output unit 2 during transportation.

Provided on the side surface of the main body cabinet unit 1 is a main body power supply switch 4. The main body power supply switch 4 serves to turn ON and OFF the main body power supply.

Figure 2:
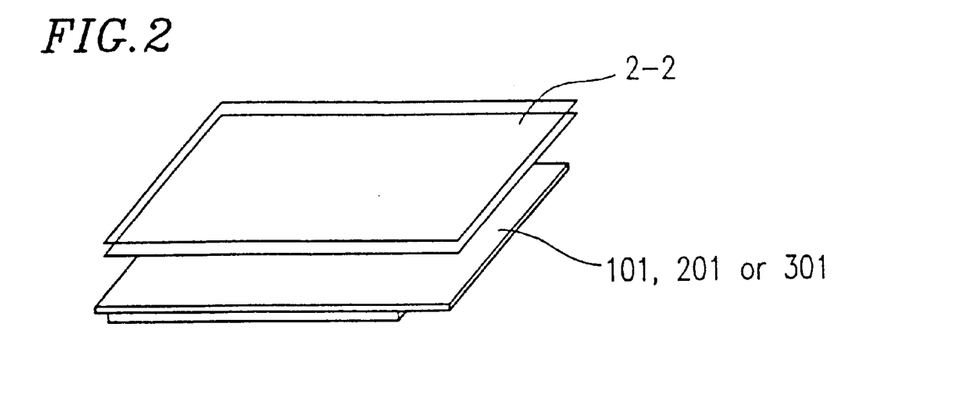
FIG. 2 is an exploded perspective view showing an input/output unit shown in FIG. 1.

FIG. 2 is an exploded perspective view of the input/output unit 2.

The input/output unit 2 is formed by integrating a thin liquid crystal display panel 101, 201, or 301 capable of displaying a character, which is formed by a matrix method, and a transparent tablet 2—2 of a size large enough to cover the liquid crystal display panel 101, 201, or 301.

A backlight device having a light source such as a fluorescent lamp is provided at a liquid crystal display panel 101, 201, or 301.

The transparent tablet 2—2 includes two transparent sheets with transparent electrodes (e.g., Indium Tin Oxide) provided on the inside surfaces thereof. (Of the two transparent sheets, the upper sheet can be, for example, a polyethylene terephthalate (PET) film, and the lower sheet can be, for example, made of glass.) In order to prevent the electrodes from touching each other in a normal state, small protruding spacers are printed in a regular manner on the inside surfaces of the transparent sheets. Therefore, by pointing with a finger or a pen, the transparent electrodes are caused to contact each other, thereby allowing detection of a selected location.

Also, by knowing the relationship between the contents displayed on the liquid crystal display panel and the information at the location selected by a user, the location in the liquid crystal display panel selected by the user is detected.

(Example 1)

Figure 3:
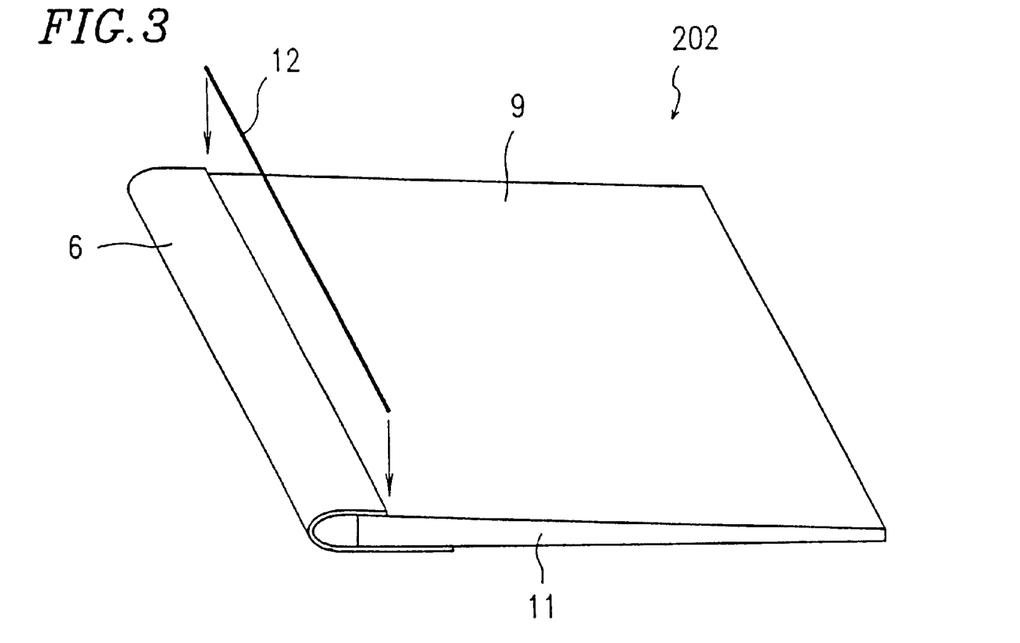
FIG. 3 is a perspective view showing a backlight device according to Example 1 of the present invention.
Figure 4:
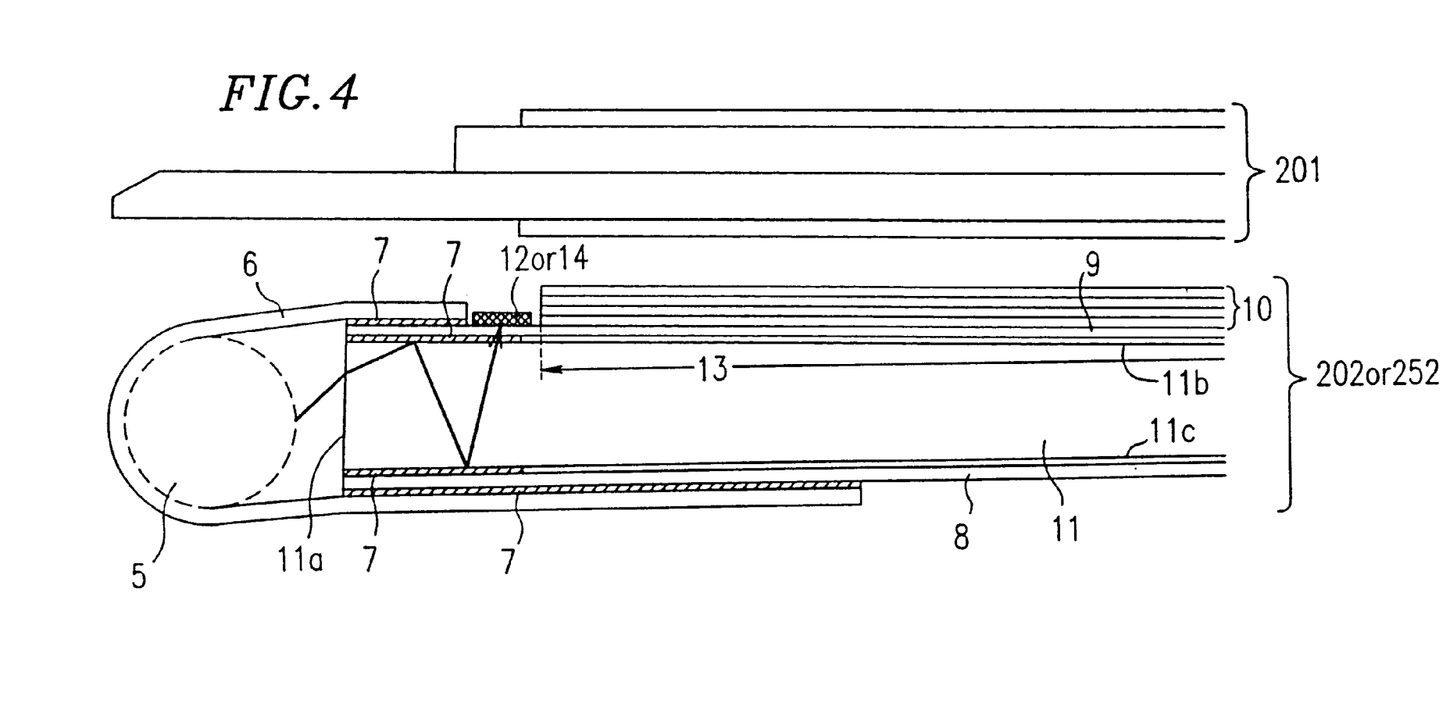
FIG. 4 is a cross-sectional view showing a part of a liquid crystal display device having the backlight device and a liquid crystal display element according to Examples 1 and 2 of the present invention.

FIG. 3 is a perspective view showing a backlight device 202 according to Example 1 of the present invention. FIG. 4 is a cross-sectional view showing a part of a liquid crystal display device having the backlight device 202 and a liquid crystal display panel 201.

As shown in FIG. 3, the backlight device 202 includes a reflector 6, a light-guiding plate 11 and a light source lamp 5 (FIG. 4) such as a fluorescent lamp, which is provided at an end surface 11a (FIG. 4) of the light-guiding plate 11.

As shown in FIG. 4, a diffusing sheet 9 for diffusing light is provided at the side of the outputting surface of the light-guiding plate 11, i.e., on the surface 11b facing the liquid crystal display panel 201 (hereinafter, referred to as a "first principal surface 11b of the light-guiding plate"). In addition, an output region 13 for outputting light incident from the end surface facing the lamp 5 is provided on the first principal surface 11b of the light-guiding plate 11. Moreover, on the diffusing sheet 9, a plurality of prism sheets 10 for controlling a direction of light are provided so as to include the output region.

In order to allow uniform light to be output to the side of the first principal surface 11b of the light-guiding plate 11, a reflection pattern (not shown) is printed on the back surface 11c of the light-guiding plate 11 (hereinafter, referred to as a "second principal surface 11c of the light-guiding plate) or provided so as to closely contact the second principal surface 11c of the light-guiding plate 11 by molding. A reflection sheet 8 is provided therebelow with its edge being fixed to the light-guiding plate 11 by a double-sided adhesive tape 7.

The reflector 6 is disposed so as to surround the lamp 5, thereby reflecting and guiding light output in a direction different from that of the light-guiding plate 11 towards the light-guiding plate 11. The reflector 6 is fixed to the reflection sheet 8 provided on the second principal surface 11c of the light-guiding plate 11 and the diffusing sheet 9 provided on the first principal surface 11b of the light-guiding plate 11 by the double-sided adhesive tapes 7 provided at the both sides thereof.

At this time, the reflector 6 to be fixed to the diffusing sheet 9 on the first principal surface 11b of the light-guiding plate 11 is fixed so as to have a distance from the prism sheets 10 provided to include the output region.

In the backlight device 202 of the present invention, an anti-reflection member 12, for example, made of a black tape with a length of the lamp 5 is provided above the first principal surface 11b of the light-guiding plate 11 in a region between the reflector 6 and the prism sheets 10 provided on the output region 13, such that light output from the prism sheets 10 sufficiently illuminates the liquid crystal display panel 201. The black tape is made of, for example, a plastic sheet, such as polyvinyl chloride or PET, having a thickness of about 50 μm.

Of light output from the lamp 5 and irregularly reflected by the double-sided adhesive tapes 7, light reflected with a small reflection angle with respect to the surface of the light-guiding plate 11, without being directly output outside through the light-guiding plate 11, returns inside the light-guiding plate 11 by the reflector 6 provided on the first principal surface 11b of the light-guiding plate 11 and the reflection sheet 8 provided on the second principal surface 11c of the light-guiding plate 11.

The light reflected with a small reflection angle with respect to the surface of the light-guiding plate 11, when compared with light incident with a large reflection angle, reflects a greater number of times in the same distance in a lateral direction with respect to the paper as shown in FIG. 4. Therefore, the light reflected with a small reflection angle has a higher possibility of being incident to the anti-reflection member 12. As a result, it is possible to absorb only the light reflected with a small reflection angle by the anti-reflection member 12 with more certainty.

In the case where the anti-reflection member 12 is provided so as to cover the entire regions where the double-sided adhesive tapes 7 are provided, light reflected with a large reflection angle with respect to the surface of the light-guiding plate 11 is also absorbed by the anti-reflection member 12, thereby inhibiting a sufficient amount of light from being reflected within the light-guiding plate 11. Therefore, it is desirable to provide the anti-reflection member 12 at the side of the output region with an appropriate width so as to absorb only light reflected with a small angle with respect to the surface of the light-guiding plate 11. For example, when the thickness of the light-guiding plate 11 is about 2 mm, it is preferable that the anti-reflection member 12 is about half the thickness of the light-guiding plate 11, i.e., about 1 mm.

According to the backlight device of the present invention, since the anti-reflection member formed above the first principal surface of the light-guiding plate in a region between the output region of the light-guiding plate and the end surface of the light-guiding plate absorbs unnecessary light that is irregularly reflected by the double-sided adhesive tapes in the vicinity of the lamp, light is not directly output outside from the light-guiding plate. Therefore, glare in a display image can be prevented, thereby accomplishing a high quality display screen.

By using a black tape as the anti-reflection member, it becomes possible to provide the anti-reflection member after the reflector is installed in the light-guiding plate. Therefore, the fabrication process can be simplified. In addition, by using black tape as the anti-reflection member, the width and the attachment position thereof can be easily changed.

(Example 2)

Figure 5:
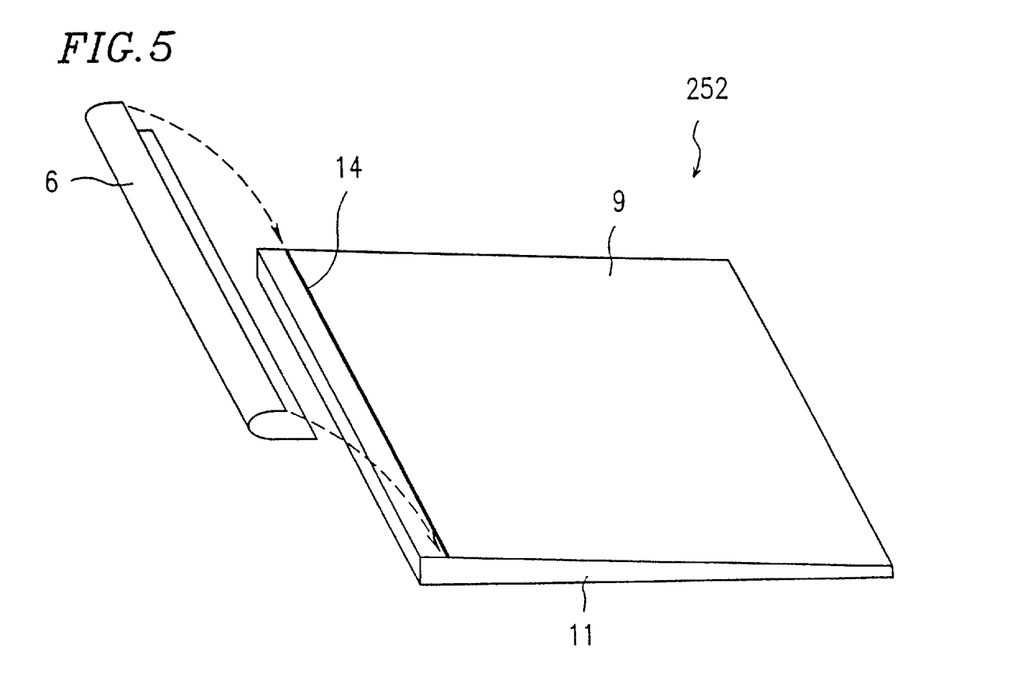
FIG. 5 is a perspective view showing the backlight device according to Example 2 of the present invention.

FIG. 5 is a perspective view showing a backlight device 252 according to Example 2 of the present invention. FIG. 4 is a cross-sectional view showing a part of a liquid crystal display device having the backlight device 252 and a liquid crystal display element 201. In Example 2, the same components as those in Example 1 are denoted by the same reference numerals.

The backlight device 252 of Example 2 includes an anti-reflection member 14 with a length of a lamp 5, which is formed by black ink printing or the like and provided above the first principal surface 11b of a light-guiding plate 11 in a region between a reflector 6 and prism sheets 10 provided so as to include an output region 13. Examples of the black ink include a mixture of a polyester type resin and a variety of solvents and color pigments, and the like.

The same effect as that in the aforementioned Example 1 can be obtained in Example 2.

By using black tape as the anti-reflection member, it is necessary to perform a plurality of steps for attaching the tape. On the other hand, by using black ink as the anti-reflection member, the number of fabrication steps can be reduced as compared to the case where black tape is employed. Therefore, the use of black ink is more preferable for mass production.

Moreover, by previously applying a black ink printing on the light-guiding plate or the diffusing sheet, the number of fabrication steps is not increased. Therefore, an increase in the production cost can be prevented.

(Example 3)

Figure 6:
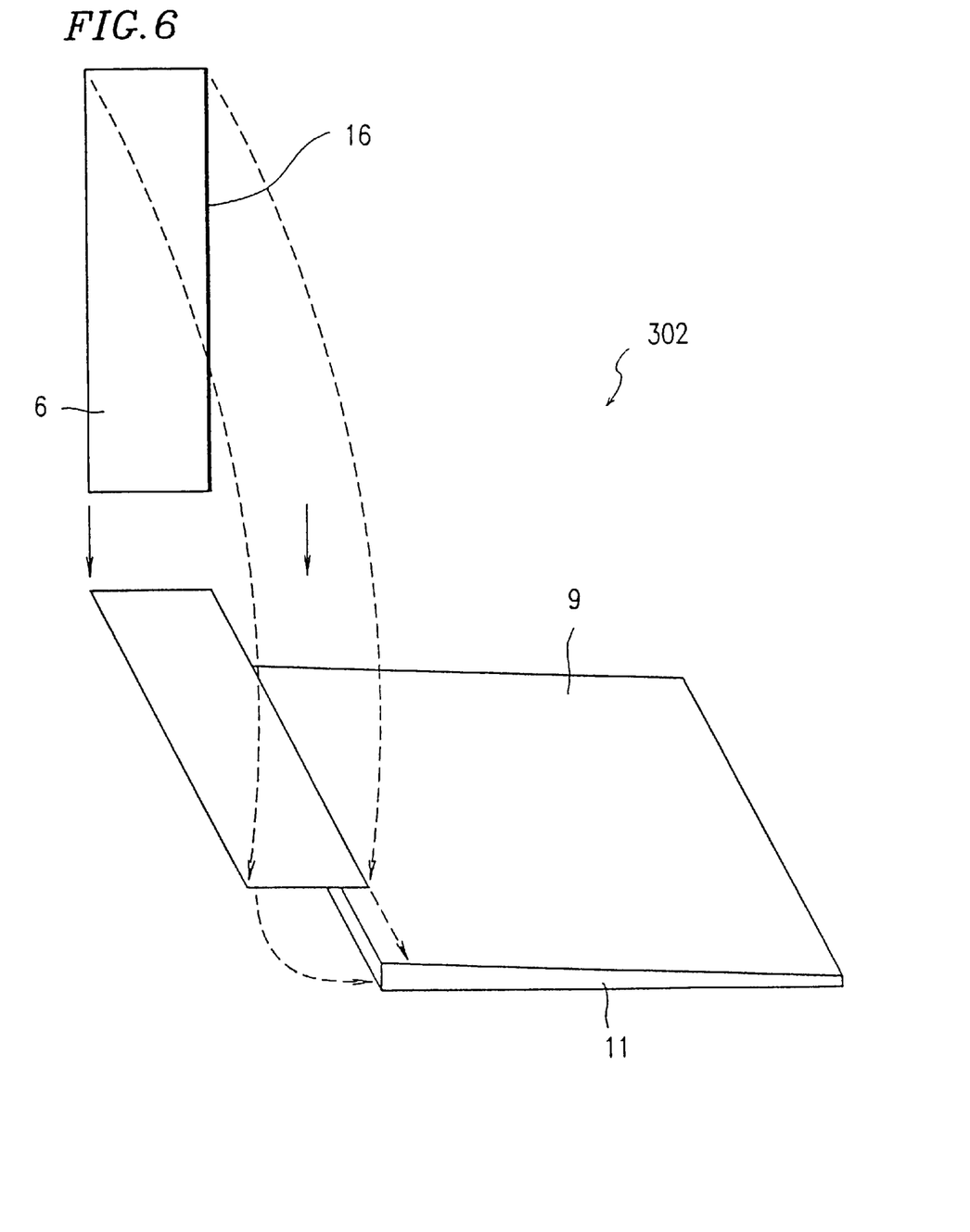
FIG. 6 is a perspective view showing a backlight device according to Example 3 of the present invention.
Figure 7:
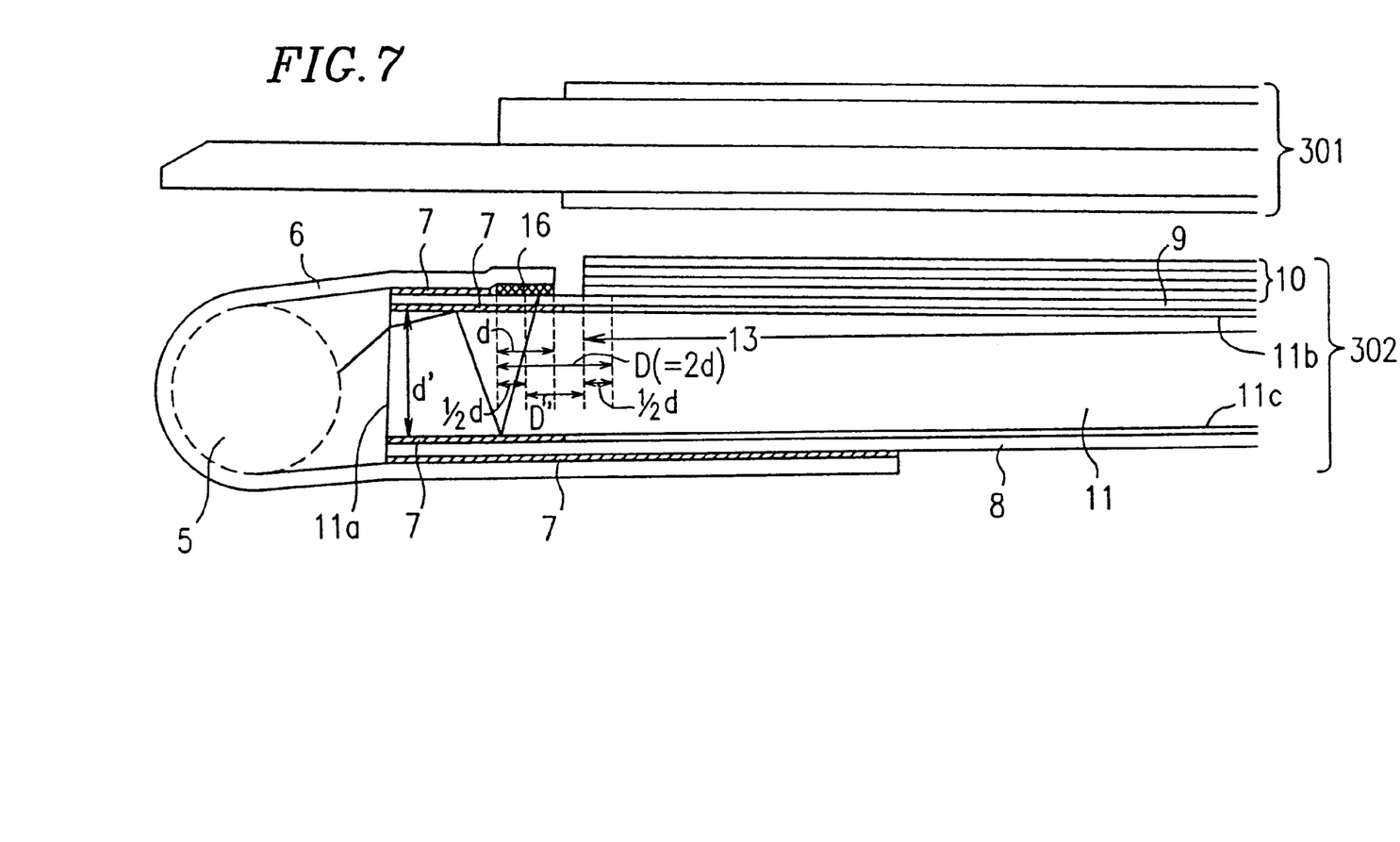
FIG. 7 is a cross-sectional view showing a part of a liquid crystal display device having the backlight device and a liquid crystal display element according to Example 3 of the present invention.

FIG. 6 is a perspective view showing a backlight device 302 according to Example 3 of the present invention. FIG. 7 is a cross-sectional view showing a part of a liquid crystal display device having the backlight device 302 and a liquid crystal display panel unit 301. In Example 3, the same components as those in Example 1 are denoted by the same reference numerals.

The backlight device 302 according to Example 3 of the present invention includes an anti-reflection member 16 with a length of a lamp 5, which is formed by black ink printing, a black tape, or the like and provided on the back surface of a reflector 6. In both of the case where black ink is used as the anti-reflection member 16 and the case where black tape is used as the anti-reflection member 16, substantially the same effect of preventing glare in a display image can be obtained.

The same effect as that in the aforementioned Example 1 can be obtained in Example 3.

In addition, according to Example 3 of the present invention, by previously attaching the anti-reflection member 16 to the back surface of the reflector 6 on the first principal surface 11b of the light-guiding plate 11, it is possible to provide the anti-reflection member 16 with a small width by aligning the anti-reflection member with the first principal surface 11b of the light-guiding plate 11. As described above, it is preferable that width d of the anti-reflection member 16 is equal to about half of the thickness d' of the light-guiding plate 11. Moreover, as shown in FIG. 7, by providing the anti-reflection member 16 so as to cover a range D (e.g., D=2d), for example, it is possible to efficiently absorb the light reflected with a small reflection angle with respect to the surface of the light-guiding plate 11. Furthermore, by providing the anti-reflection member 16 so as to cover a range D', for example, it is possible to absorb the light reflected with a small reflection angle with respect to the surface of the light-guiding plate 11 more efficiently.

As described above, since the backlight device of this invention includes the anti-reflection member formed above the first principal surface of the light-guiding plate in a region between the output region of the light-guiding plate and the end surface of the light-guiding plate, it is possible to absorb unnecessary light irregularly reflected by the double-sided adhesive tapes provided in the vicinity of the lamp. As a result, since light is not directly output outside from the light-guiding plate, glare in a display image can be prevented, thereby obtaining a high quality display screen. Moreover, by previously attaching the anti-reflection member to the back surface of the reflector, an anti-reflection member with a small width can be provided by aligning the anti-reflection member with the first principal surface of the light-guiding plate.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A backlight device comprising:

a light source;

a light-guiding plate; and a reflector, wherein the light-guiding plate has a first principal surface and a second principal surface provided so as to face each other, and an end surface;

the reflector is disposed so as to illuminate the end surface with light from the light source;

the light-guiding plate has an output region on the first principal surface, for outputting light inputted from the end surface; and an anti-reflection member is provided above the first principal surface in a region between the output region and the end surface; and wherein the reflector covers the light source and the anti-reflection member.

2. A backlight device according to claim 1, wherein the anti-reflection member is made of black ink.

3. A backlight device according to claim 1, wherein the anti-reflection member is made of a black tape.

4. A backlight device comprising:

a light source;

a light-guiding plate; and a reflector, wherein the light-guiding plate has a first principal surface and a second principal surface provided so as to face each other, and an end surface;

the reflector is disposed so as to illuminate the end surface with light from the light source;

the light-guiding plate has an output region on the first principal surface, for outputting light inputted from the end surface; and an anti-reflection member is provided above the first principal surface in a region between the output region and the end surface; and wherein the light-guiding plate has a diffusing sheet on the first principal surface, and the anti-reflection member is formed on the diffusing sheet.

5. A backlight device according to claim 4 further comprising a prism sheet above the output region of the light-guiding plate.

6. A backlight device according to claim 4, wherein the reflector covers the light source and the anti-reflection member.

7. A backlight device according to claim 4, wherein the anti-reflection member is made of black ink.

8. A backlight device according to claim 4, wherein the anti-reflection member is made of a black tape.

* * * * *